United States Patent
Ahn et al.

(10) Patent No.: US 9,122,474 B2
(45) Date of Patent: Sep. 1, 2015

(54) APPARATUS AND METHOD FOR REDUCING OVERHEAD CAUSED BY COMMUNICATION BETWEEN CLUSTERS

(75) Inventors: Min-Wook Ahn, Seoul (KR); Tai-Song Jin, Seoul (KR); Hee-Jin Ahn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 637 days.

(21) Appl. No.: 13/546,340

(22) Filed: Jul. 11, 2012

(65) Prior Publication Data

US 2013/0124825 A1   May 16, 2013

(30) Foreign Application Priority Data

Nov. 15, 2011 (KR) .................. 10-2011-0119147

(51) Int. Cl.
*G06F 9/38* (2006.01)
*G06F 9/30* (2006.01)
*G06F 9/00* (2006.01)

(52) U.S. Cl.
CPC .......... *G06F 9/30032* (2013.01); *G06F 9/3828* (2013.01)

(58) Field of Classification Search
None
See application file for complete search history.

(56) References Cited

U.S. PATENT DOCUMENTS

| 5,838,984 | A | 11/1998 | Nguyen et al. |
| 7,647,473 | B2 | 1/2010 | Kamigata et al. |
| 8,127,117 | B2 | 2/2012 | Zeng et al. |
| 2008/0126762 | A1* | 5/2008 | Kelley et al. ................. 712/225 |

FOREIGN PATENT DOCUMENTS

| KR | 10-0236527 | 12/1999 |
| KR | 10-0822612 | 4/2008 |
| KR | 10-2009-0009959 | 1/2009 |
| KR | 10-2010-0034976 | 4/2010 |

* cited by examiner

*Primary Examiner* — Scott Sun
(74) *Attorney, Agent, or Firm* — NSIP Law

(57) ABSTRACT

A technique for minimizing overhead caused by copying or moving a value from one cluster to another cluster is provided. A number of operations, for example, a mov operation for moving or copying a value from one cluster to another cluster and a normal operation may be executed concurrently. Accordingly, access to a register file outside of the cluster may be reduced and the performance of code may be improved.

20 Claims, 6 Drawing Sheets

(a)
```
op   dst0 <- src0, src1
mov  dst2 <- dst1       // dst1 and dst2 are on
                        // different register files
```

(b)
```
op   dst0 <- src0, src1, dst2, dst1   // This implicitly means the
                                      // move from dst1 to dst2.
```

(c)
```
op   dst0 <- src0, src1, [0|1]   // 0 : no implicit mov operation
                                 // 1 : implicit mov operation
```

APPARATUS AND METHOD FOR REDUCING OVERHEAD CAUSED BY COMMUNICATION BETWEEN CLUSTERS

CROSS-REFERENCE TO RELATED APPLICATION(S)

This application claims the benefit under 35 USC §119(a) of Korean Patent Application No. 10-2011-0119147, filed on Nov. 15, 2011, in the Korean Intellectual Property Office, the entire disclosure of which is incorporated herein by reference for all purposes.

BACKGROUND

1. Field

The following description relates to a technique for reducing overhead caused by communication from one cluster to another cluster.

2. Description of the Related Art

An application program that includes large parallelism typically requires a register file that has a great number of ports and registers to concurrently access many operands during processing. However, implementation of such a register file is very difficult and incurs enormous hardware expense.

To solve these drawbacks, a clustered architecture has been introduced. In a clustered architecture an independent register file is provided for each cluster unit. The clustered architecture typically has a small number of ports, and operations are concurrently input to multiple clusters and executed. In the clustered architecture, access to many operands is possible, thus various application programs can be executed with a register file having a simpler architecture.

However, if one cluster needs to access a register file that is outside of the cluster, for example, if one cluster needs to move data or copy data to a register file of another cluster, overhead may be incurred. In this example, if the cluster has a large number of data move or data copy operations to a register file of another cluster, a large amount of overhead may be incurred and throughput efficiency may be degraded.

SUMMARY

In one aspect, there is provided an apparatus for reducing overhead caused by communication between clusters, the apparatus including an implicit operation generating unit configured to generate an implicit operation that implies the presence of a copy operation that is to be executed concurrently with a normal operation within a basic block of code, and an operand providing unit configured to insert an operand providing operation into the basic block of code to provide an operand value of the copy operation to be executed, in response to the implicit operation being executed.

The implicit operation may comprise an additional operand which indicates the presence of the copy operation to be executed concurrently with each of the normal operations.

The operand that indicates the presence of the copy operation may comprise a single bit that is set to either "0" or "1" to represent the absence or the presence of the copy operation.

The copy operation may comprise an operation to copy or move a value from one cluster to another cluster, and the normal operation may comprise an operation within a cluster.

The copy operation may comprise a mov operation and the normal operation may comprise an add operation.

The apparatus may further comprise a scheduling unit configured to schedule the basic block of code in consideration of the generated implicit operation.

The operand providing operation may comprise four operands.

The operand providing operation may comprise a pushmvs operation which is inserted into the basic block of code and which provides an operand value for the copy operation.

The operand providing operation may pair values of its operands and input the pairs sequentially to a hardware buffer.

The implicit operation may read a corresponding operand value for the copy operation from the hardware buffer and execute the copy operation concurrently with the normal operation.

In another aspect, there is provided a method of minimizing overhead caused by communication between clusters, the method including generating an implicit operation that implies the presence of a copy operation that is to be executed concurrently with a normal operation within a basic block of code, and inserting an operand providing operation into the basic block of code to provide an operand value of the copy operation to be executed, in response to the implicit operation being executed.

The implicit operation may comprise an additional operand that indicates the presence of the copy operation to be executed concurrently with the normal operation.

The operand that indicates the presence of the copy operation may consist of a single bit that is set to either "0" or "1" to represent the absence or the presence of the copy operation.

The method may further comprise rescheduling the basic block of code in consideration of the generated implicit operation.

The copy operation may comprise an operation to copy or move a value from one cluster to another cluster, and the normal operation may comprise an operation performed within a cluster.

The operand providing operation may pair values of its operands and input the pairs sequentially to a hardware buffer.

The implicit operation may read a corresponding operand value for the copy operation from the hardware buffer and execute the copy operation concurrently with the normal operation.

In another aspect, there is provided a processor with a clustered architecture, the processor including an implicit operation generator configured to generate an implicit operation comprising an intra-cluster operation and an inter-cluster operation within a basic block of code which are to be executed concurrently, and a processing core configured to concurrently execute the intra-cluster operation and the inter-cluster operation included in the implicit operation.

The inter-cluster operation may comprise at least one of a copy operation and a move operation configured to copy or to move a value from a first cluster to a second cluster, respectively.

The implicit operation may further comprise an operand which indicates the presence of the inter-cluster operation within the implicit operation.

The implicit operation generator may be further configured to analyze a dependence of operations within the basic block of code to determine the intra-cluster operation and the inter-cluster operation to be included in the implicit operation.

Other features and aspects may be apparent from the following detailed description, the drawings, and the claims.

Figure 1:
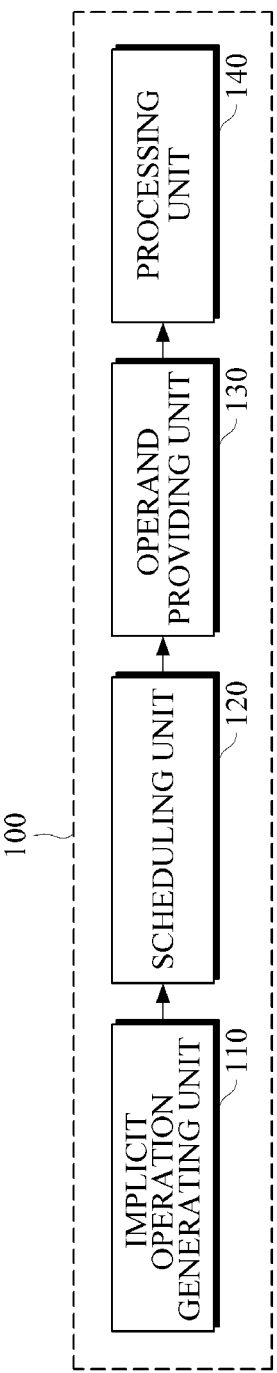
FIG. 1 is a diagram illustrating an example of an apparatus for reducing overhead caused by communication between clusters.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of an apparatus for minimizing overhead caused by communication between clusters.

Referring to FIG. 1, apparatus 100 includes an implicit operation generating unit 110, a scheduling unit 120, an operand providing unit 130, and a processing unit 140. Apparatus 100 may be or may be included in a processor. The processor may be included in a terminal, for example, a computer, a smart phone, a tablet, an appliance, and the like. The processor includes a clustered architecture. For example, the processor may be a superscalar processor, a very long instruction word (VLIW) processor, and the like.

The implicit operation generating unit 110 may generate implicit operations. As an example, an implicit operation may imply the presence of a copy operation that is to be executed concurrently with a normal operation in a basic block of code. For example, the copy operation may copy or move a value of one cluster to another cluster. This is a copy operation is also referred to as an inter-cluster operation. In this example, the copy operation may include an operation, for example, a mov operation. Because such operations typically require regular access to a register file outside of a cluster, the performance of an application code which uses a large amount of copy operations may be remarkably degraded.

A normal operation is an operation performed within a cluster. For example, a normal operation may be an add operation, a mul operation, and the like. A normal operation does not exchange values between different clusters. That is, a normal operation includes an intra-cluster operation.

An implicit operation is an operation that is defined to execute a normal operation and a copy operation in parallel with each other. For example, an implicit operation may be generated for each of the normal operations within a basic block. In this example, the implicit operation implies the presence of a copy operation to be executed.

For example, the implicit operation generating unit 110 may search for a copy operation to be executed concurrently with a normal operation based on dependence between operations within a basic block. The implicit operation generating unit 110 may store a pair of operations including a found copy operation and the normal operation in a temporary table. In this example, the implicit operation generating unit 110 may check whether general instructions have a copy instruction to be executed together with reference to the table, and generate an implicit operation based on the check result.

The scheduling unit 120 may schedule the basic block in consideration of the generated implicit operations. Because the generation of the implicit operations causes modification of the code within the basic block, re-scheduling may be performed.

The operand providing unit 130 may insert an operand providing operation into an upper portion of the basic block of code. For example, the operand providing operation may provide an operand value of the copy operation to be executed in response to the execution of an implicit operation. An operand value of the copy operation may be provided to the implicit operation before the implicit operation is executed. Thus, operation code may be inserted at the beginning of the basic block to provide operand values of copy operations to the implicit operations before the execution of the implicit operations.

Processing unit 140 may execute the implicit operation. For example, the processing unit 140 may process in parallel the copy operation and the normal operation included in the implicit operation. For example, the processing unit may simultaneously process the copy operation and the normal operation. It should be appreciated that the processing unit 140 may also execute other operations in addition to the implicit operations.

Figure 2:
FIG. 2 is a diagram illustrating an example of generating an implicit operation to execute a MOV operation concurrently with a normal operation.
Figure 2:

FIG. 2 illustrates an example of generating an implicit operation to execute a MOV operation concurrently with a normal operation.

In (a) of FIG. 2, "op operation" represents a normal operation for performing an operation within a cluster. Examples of a normal operation include "add," "mul," and the like. Below the op operation, an example of a mov operation is provided. The mov operation may be a copy operation to exchange values between clusters. If a copy operation that needs to access a register file of another cluster is executed, the overall cycle time may be increased and efficiency may be degraded.

If a normal operation such as an op operation is executed concurrently with a mov operation as shown in (b) of FIG. 2, the throughput efficiency may be increased. However, if an operation has more than three operands as shown in (b) of FIG. 2, whereas general operations typically have three operands, there may occur a lack of encoding bits. In this example, the implicit operation may further include an operand that indicates the presence of a copy operation to be executed in addition to an original normal operation as shown in (c) of FIG. 2. For example, the operand (hereinafter, referred to as an "emb") that indicates the presence of the copy operation may consist of 1 bit. That is, emb may be set to either "0" or "1" to indicate the presence of a copy operation. For example, if there is no copy operation to be executed concurrently with a normal operation, emb may be set to "0," otherwise, emb may be set to "1."

Figure 3:
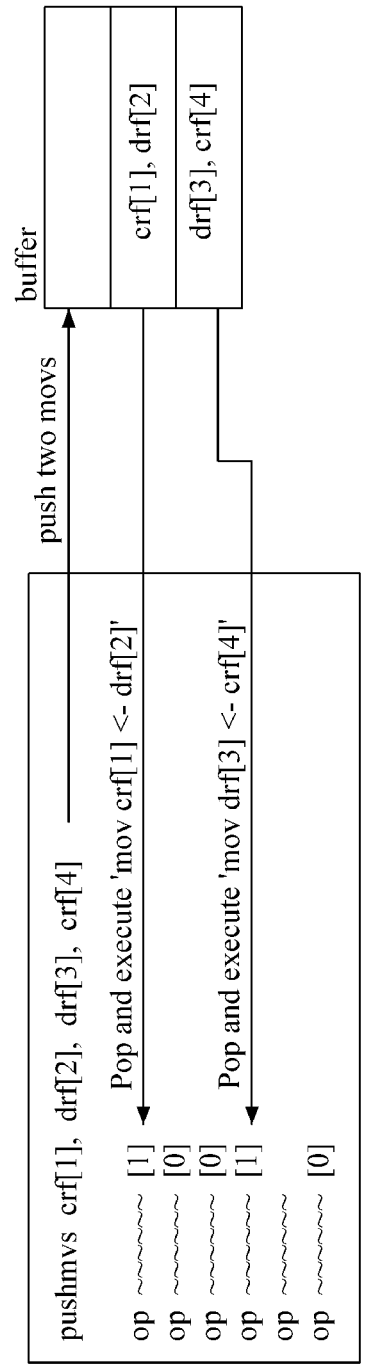
FIG. 3 is a diagram illustrating an example of an implicit operation and operand providing operations within a basic block of code.
Figure 4:
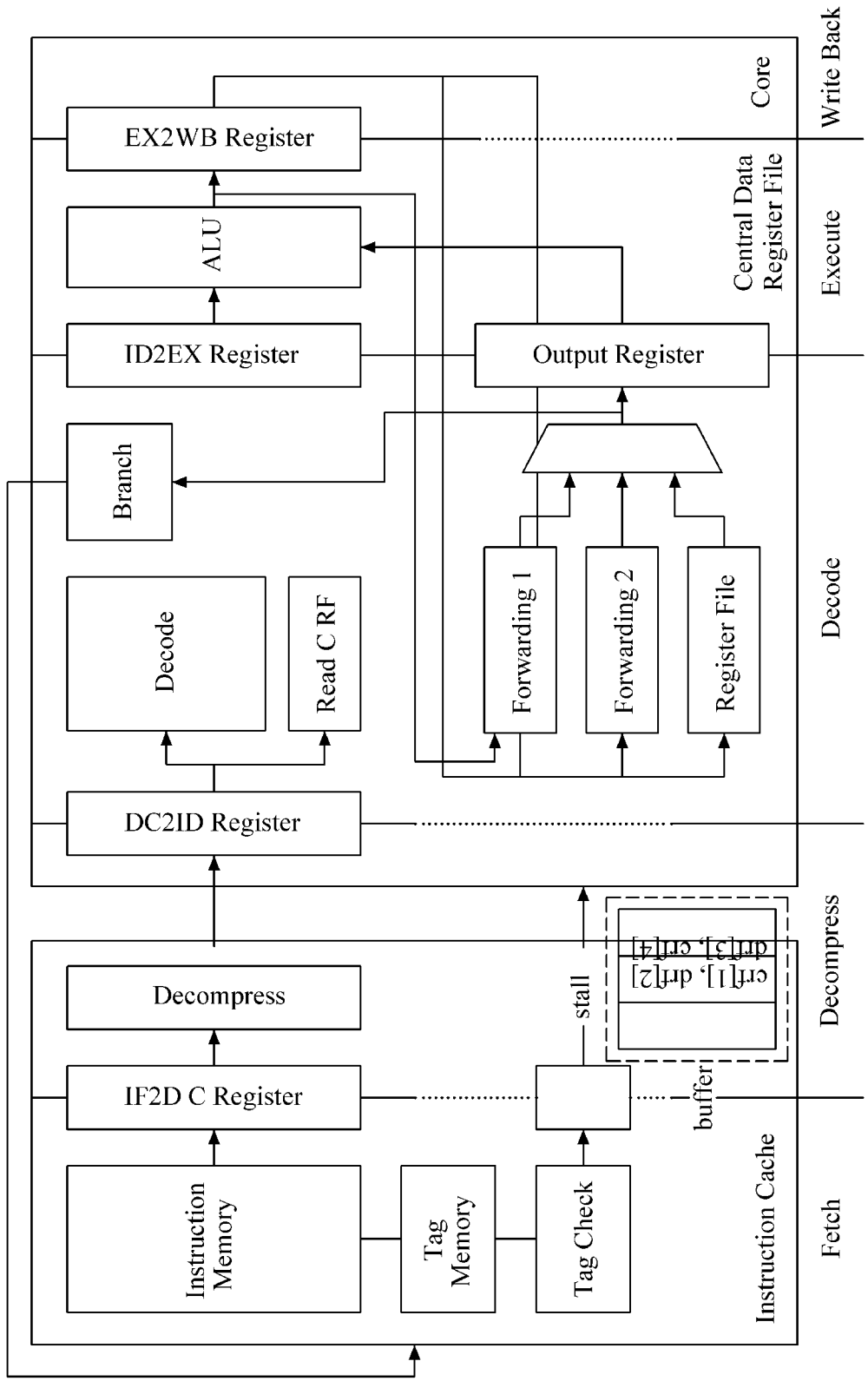
FIG. 4 is a diagram illustrating an example of a position of a hardware buffer in a processor.

FIG. 3 illustrates an example of an implicit operation and operand providing operations within a basic block. FIG. 4 illustrates an example of a position of a hardware buffer in a processor.

Generally, scheduling and register allocation with respect to application source code is completed by a compiler. Subsequently, assembly code is generated. In the examples shown in FIGS. 3 and 4, in response to scheduling and register allocation with respect to application source code being completed, an implicit operation is generated. For example, the implicit operation may be generated before assembly code is generated. For example, the implicit operation generating unit 110 may analyze dependence between all of operations within a basic block of code after the register allocation is completed in the compiler, and find normal operations and copy operations to be executed concurrently with the respective normal operations. The found normal operations and the copy operations may be paired and may be stored in a temporary table.

For example, an emb value of an implicit operation that includes a normal operation and a peer copy operation to be executed together may be set to "1," and an emb value of an implicit operation that includes a normal operation that does not have a peer copy operation to be executed together may be set to "0."

Referring to FIG. 3, the first and the fourth implicit operations include a copy operation to be executed concurrently with a normal operation. Accordingly, if the processor executes the first and the fourth implicit operations, copy operations are executed together with normal operations. In this example, an operand value of a copy operation may be provided.

Accordingly, an operand providing operation may be inserted at a top of the basic block to provide an operand value of the copy operation as shown in FIG. 3. For example, the operand providing operation may be a newly defined operation such as "pushmvs" as shown in FIG. 3. As an example, the operand providing operation may have four operands. In response to executing the operand providing operation in the processor, the operand providing operation may pair values of the four operands, and may input the pairs of operand values sequentially to a hardware buffer. For example, the hardware buffer may be located at a decompression pipeline stage, as shown in FIG. 4, at a decode stage, and the like.

If there is a copy operation that is to be executed while the implicit operation is executed, the implicit operation may execute the copy operation by reading a corresponding operand value from the hardware buffer in a decode stage or a decompression pipeline stage. For example, in response to operations of pushmvs crf[1], drf[2], drf[3], crf[4] being executed in the example illustrated in FIG. 3, a pair of crf[1] and drf[2] and a pair of drf[3] and crf[4] are input to the hardware buffer. In response to the first implicit operation being executed, the first value including the pair of crf[1] and drf[2], is read from the hardware buffer to execute a normal operation concurrently with a copy operation, mov crf[1]<-drf[2]. Likewise, in response to the fourth implicit operation being executed, the second value including the pair of drf[3] and crf[4], is read from the hardware buffer to execute a normal operation concurrently with a copy operation, mov drf[3]<-drf[4].

Figure 5:
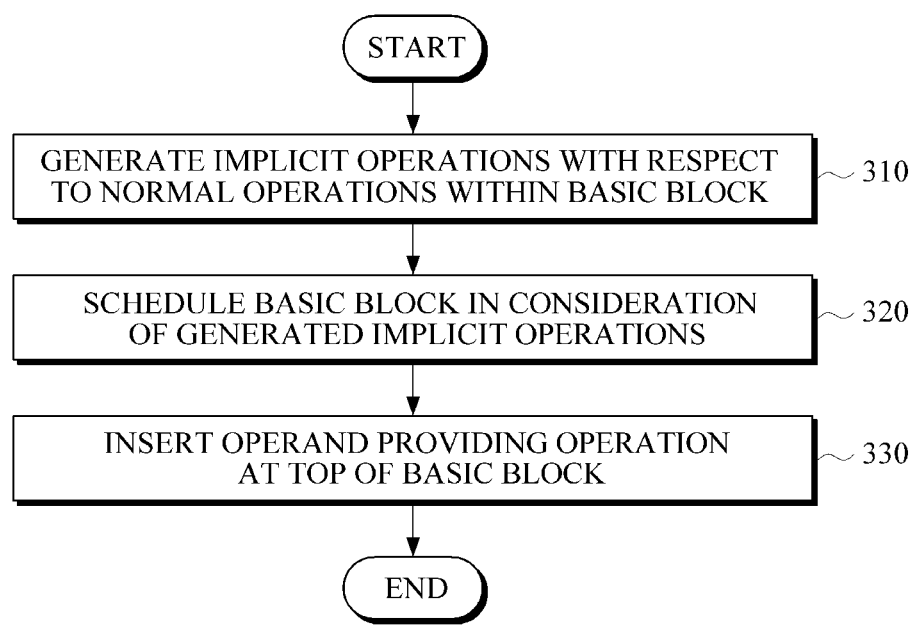
FIG. 5 is a flowchart illustrating an example of a method of reducing overhead caused by a communication between clusters.

FIG. 5 illustrates an example of a method of reducing overhead caused by a communication between clusters. The method shown in FIG. 5 may be performed after scheduling and register allocation with respect to application code has been completed by a compiler.

Referring to FIG. 5, implicit operations are generated in 310. Each implicit operation implies the presence of a copy operation that is to be executed concurrently with normal operations within a basic block. For example, the copy operation may copy or move a value from one cluster to another cluster, and may include a mov operation. The normal operation is for an operation within a cluster and may include, for example, an add operation, a mul operation, and the like, and is not involved with the exchange of values between clusters.

The implicit operation is an operation to execute a normal operation and a copy operation concurrently, and may be generated for each of the operations within a basic block of code, implying the presence of the copy operation to be executed. In various examples, the implicit operation may further include an additional operand to indicate the presence of the copy operation to be executed in addition to the original normal operation as shown in (c) of FIG. 2. In addition, an operand such as emb may be used to indicate the presence of the copy operation, and may consist of 1 bit.

In 320, in consideration of the generated implicit operations, the basic block is re-scheduled. Generally, assembly code is generated after completion of scheduling and register allocation with respect to application source code. In this example, after the scheduling and register allocation with respect to application source code is completed, the implicit operations may be generated before assembly code is generated. Re-scheduling may be performed taking into consideration the generated implicit operations. For example, as a result of the generation of the implicit operations and the scheduling, the first and the fourth implicit operations shown in FIG. 3 have emb that is set to "1" because there is a copy operation to be executed, and the rest of the implicit operations shown in FIG. 3 have emb that is set to "0" because there is no copy operation to be executed concurrently with the normal operation.

In 330, an operand providing operation for providing an operand value of the copy operation to be executed is inserted into a top of the basic block. In response to the first and the fourth implicit operations in the basic block shown in FIG. 3 being executed, the copy operation is concurrently executed. However, in this example, an operand value of the copy operation may be provided prior to the execution. For example, the operand providing operation (for example, pushmvs) may be inserted into the top of the basic block.

For example, the operand providing operation may have four operands, and when the operand providing operation itself is executed in a processor, the operand providing operation may pair the operands into two pairs, and sequentially input the pairs to a hardware buffer.

In the presence of a copy operation that is to be executed concurrently with the execution of the implicit operation, the implicit operation may read a corresponding operand value from the hardware buffer in a decode stage or a decompression pipeline stage and execute the copy operation. For example, in the example illustrated in FIG. 3, if the operation, pushmvs crf[1], drf[2], drf[3], crf[4], is executed, pairs of crf[1] and drf[2] and drf[3] and crf[4] are input to the hardware buffer. Thereafter, in response to the first implicit operation being executed, the first value including the pair of crf[1] and drf[2] is read from the hardware buffer, and a copy operation, mov crf[1]<-drf[2], is executed concurrently with a normal operation. Likewise, in response to the fourth implicit operation being executed, the second value including the pair of drf[3] and crf[4] is read from the hardware buffer, and a copy operation, mov drf[3]<-drf[4], is executed concurrently with a normal operation.

Figure 6:
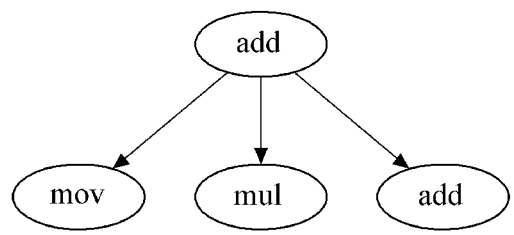
FIG. 6 is a diagram illustrating an example of a scheduling result after generation of an implicit operation.

FIG. 6 illustrates an example of a scheduling result after generation of an implicit operation.

A simple dependence graph consisting of four operations is shown in an upper portion of FIG. 6. The four operations include a copy operation (mov), and three normal operations including add, mul, and add. If code of these operations is scheduled intact, three cycles are typically required as shown in the lower left-handed corner of FIG. 6. However, if the implicit operations are generated and scheduled in consideration of dependence between the operations, one cycle may be reduced as shown in the lower right-handed corner of FIG. 6, when compared to the cycles shown in the lower left-handed corner of FIG. 6. As a result, three cycles of operations can be executed in two cycles.

The apparatus and method shown in the above examples may contribute to the improvement of the performance of processing an application source code through the use of implicit operations.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for reducing overhead caused by communication between clusters, the apparatus comprising:
    an implicit operation generating unit configured to generate an implicit operation that implies the presence of a copy operation that is to be executed concurrently with a normal operation within a basic block of code; and
    an operand providing unit configured to insert an operand providing operation into the basic block of code to provide an operand value of the copy operation to be executed, in response to the implicit operation being executed.

2. The apparatus of claim 1, wherein the implicit operation comprises an additional operand which indicates the presence of the copy operation to be executed concurrently with each of the normal operations.

3. The apparatus of claim 2, wherein the operand that indicates the presence of the copy operation comprises a single bit that is set to either "0" or "1" to represent the absence or the presence of the copy operation.

4. The apparatus of claim 1, wherein the copy operation comprises an operation to copy or move a value from one cluster to another cluster, and the normal operation comprises an operation within a cluster.

5. The apparatus of claim 1, further comprising:
    a scheduling unit configured to schedule the basic block of code in consideration of the generated implicit operation.

6. The apparatus of claim 1, wherein the operand providing operation comprises four operands.

7. The apparatus of claim 1, wherein the operand providing operation comprises a pushmvs operation which is inserted into the basic block of code and which provides an operand value for the copy operation.

8. The apparatus of claim 1, wherein the operand providing operation pairs values of its operands and inputs the pairs sequentially to a hardware buffer.

9. The apparatus of claim 8, wherein the implicit operation reads a corresponding operand value for the copy operation from the hardware buffer and executes the copy operation concurrently with the normal operation.

10. A method of minimizing overhead caused by communication between clusters, the method comprising:
    generating an implicit operation that implies the presence of a copy operation that is to be executed concurrently with a normal operation within a basic block of code; and
    inserting an operand providing operation into the basic block of code to provide an operand value of the copy operation to be executed, in response to the implicit operation being executed.

11. The method of claim 10, wherein the implicit operation comprises an additional operand that indicates the presence of the copy operation to be executed concurrently with the normal operation.

12. The method of claim 11, wherein the operand that indicates the presence of the copy operation consists of 1 bit that is set to either "0" or "1" to represent the absence or the presence of the copy operation.

13. The method of claim 10, further comprising:
rescheduling the basic block of code in consideration of the generated implicit operation.

14. The method of claim 10, wherein the copy operation comprises an operation to copy or move a value from one cluster to another cluster, and the normal operation comprises an operation performed within a cluster.

15. The method of claim 10, wherein the operand providing operation pairs values of its operands and inputs the pairs sequentially to a hardware buffer.

16. The method of claim 15, wherein the implicit operation reads a corresponding operand value for the copy operation from the hardware buffer and executes the copy operation concurrently with the normal operation.

17. A processor with a clustered architecture, the processor comprising:

an implicit operation generator configured to generate an implicit operation comprising an intra-cluster operation and an inter-cluster operation within a basic block of code which are to be executed concurrently; and a processing core configured to concurrently execute the intra-cluster operation and the inter-cluster operation included in the implicit operation.

18. The processor of claim 17, wherein the inter-cluster operation comprises at least one of a copy operation and a move operation configured to copy or to move a value from a first cluster to a second cluster, respectively.

19. The processor of claim 17, wherein the implicit operation further comprises an operand which indicates the presence of the inter-cluster operation within the implicit operation.

20. The processor of claim 17, wherein the implicit operation generator is further configured to analyze a dependence of operations within the basic block of code to determine the intra-cluster operation and the inter-cluster operation to be included in the implicit operation.

* * * * *